United States Patent
Fuehrer

(10) Patent No.: US 10,453,340 B2
(45) Date of Patent: Oct. 22, 2019

(54) METHOD AND APPARATUS FOR MONITORING AUTOMATIC PARKING OF A VEHICLE

(71) Applicant: Robert Bosch GmbH, Stuttgart (DE)

(72) Inventor: Thomas Fuehrer, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 15/509,088

(22) PCT Filed: Aug. 4, 2015

(86) PCT No.: PCT/EP2015/067941
§ 371 (c)(1),
(2) Date: Mar. 6, 2017

(87) PCT Pub. No.: WO2016/041689
PCT Pub. Date: Mar. 24, 2016

(65) Prior Publication Data
US 2017/0278394 A1    Sep. 28, 2017

(30) Foreign Application Priority Data
Sep. 19, 2014    (DE) .................. 10 2014 218 921

(51) Int. Cl.
*G08G 1/127*    (2006.01)
*G06T 7/70*    (2017.01)
(Continued)

(52) U.S. Cl.
CPC ............. *G08G 1/127* (2013.01); *B60W 30/06* (2013.01); *B60W 50/04* (2013.01); *B62D 15/0285* (2013.01); *G06K 9/00711* (2013.01); *G06K 9/00771* (2013.01); *G06K 9/00812* (2013.01); *G06T 7/70* (2017.01); *G06K 2209/15* (2013.01);
(Continued)

(58) Field of Classification Search
CPC . B60W 30/06; B62D 15/027; B62D 15/0275; B62D 15/028; B62D 15/0285; B60Q 9/002; B60R 25/1012; B60R 2300/80; B60R 2300/802; B60R 2300/806; B60R 2300/8086; E04H 6/422; E04H 6/424; E04H 6/426; G06K 9/00791; G06K 9/00805; G06K 9/00812
See application file for complete search history.

(56) References Cited

U.S. PATENT DOCUMENTS 9,581,997 B1 *   2/2017   Penilla ................. G05D 1/0011
10,043,307 B2 *  8/2018   Krishnamoorthy ..... G06T 17/05
(Continued)

FOREIGN PATENT DOCUMENTS

DE    102009041587 A1 *   3/2011    ............... B62D 1/00
EP    2295281 A1    3/2011
(Continued)

*Primary Examiner* — Thomas G Black
*Assistant Examiner* — Sara J Lewandroski
(74) *Attorney, Agent, or Firm* — Norton Rose Fulbright US LLP; Gerard Messina

(57) ABSTRACT

A method for monitoring automatic parking of a vehicle, at least one video image of an execution of the automatic parking of the vehicle being captured and transmitted to a mobile terminal device. A corresponding apparatus, a corresponding system and a parking system, are also provided.

9 Claims, 2 Drawing Sheets

(51) Int. Cl.
*G06K 9/00* (2006.01)
*B62D 15/02* (2006.01)
*B60W 30/06* (2006.01)
*B60W 50/04* (2006.01)

(52) U.S. Cl.
CPC ............... *G06T 2207/30232* (2013.01); *G06T 2207/30264* (2013.01)

(56) References Cited

U.S. PATENT DOCUMENTS

| | | | | |
|---|---|---|---|---|
| 2003/0069665 | A1* | 4/2003 | Haag | E04H 6/422 700/217 |
| 2005/0033495 | A1* | 2/2005 | Tanaka | B60Q 9/005 701/36 |
| 2010/0156672 | A1* | 6/2010 | Yoo | G08G 1/14 340/932.2 |
| 2011/0182703 | A1* | 7/2011 | Alan | E04H 6/183 414/231 |
| 2014/0121883 | A1* | 5/2014 | Shen | B62D 15/0285 701/28 |
| 2014/0210646 | A1* | 7/2014 | Subramanya | B61L 29/28 340/928 |
| 2014/0218527 | A1* | 8/2014 | Subramanya | G08G 1/143 348/148 |
| 2015/0039173 | A1* | 2/2015 | Beaurepaire | B60W 30/06 701/23 |
| 2015/0127208 | A1* | 5/2015 | Jecker | B62D 15/025 701/23 |
| 2015/0338849 | A1* | 11/2015 | Nemec | G05D 1/0055 701/25 |
| 2015/0344028 | A1* | 12/2015 | Gieseke | B60W 30/00 701/1 |
| 2016/0224025 | A1* | 8/2016 | Petel | B62D 15/0285 |

FOREIGN PATENT DOCUMENTS

| | | | | |
|---|---|---|---|---|
| JP | 2001236496 A | 8/2001 | | |
| JP | 2001266296 A | 9/2001 | | |
| JP | 2006302187 A | 11/2006 | | |
| JP | 2011016401 A | 1/2011 | | |
| JP | 2011253295 A | 12/2011 | | |
| KR | 20140073131 A | * | 6/2014 | ............ B60K 35/00 |
| KR | 20140073131 A | 6/2014 | | |
| WO | 2013156361 A1 | 10/2013 | | |

\* cited by examiner

METHOD AND APPARATUS FOR MONITORING AUTOMATIC PARKING OF A VEHICLE

FIELD

The present invention relates to a method and an apparatus for monitoring automatic parking of a vehicle. The present invention also relates to a system for monitoring automatic parking of a vehicle. In addition, the present invention relates to a parking system for the parking of vehicles.

BACKGROUND INFORMATION

At present, there are efforts to park a vehicle automatically without the need for a driver of the vehicle to intervene manually for that purpose. Thus, for example, upon entering a parking garage, the intention is for a driver to be able to leave and lock his vehicle. The vehicle should subsequently park automatically. Conventionally, in the case of existing automatic parking methods, after the parking maneuver has ended, a driver receives a message, for example, an SMS, sent to his smartphone, that the vehicle was parked successfully. The automatic parking is also referred to as valet parking.

There is a need for monitoring or tracking of the vehicle during the automatic parking.

SUMMARY

An object of the present invention is to provide of a method for monitoring automatic parking of a vehicle, which makes it possible to monitor or track a vehicle during the automatic parking process.

In addition, an object of the present invention is to provide a corresponding apparatus for monitoring automatic parking of a vehicle.

Moreover, an object of the present invention is to provide a corresponding system for monitoring automatic parking of a vehicle.

An object underlying the present invention is to provide a corresponding parking system for the parking of vehicles.

Advantageous developments of the present invention are described herein.

According to one aspect, a method is provided for monitoring automatic parking of a vehicle, at least one video image of an execution of the automatic parking of the vehicle being taken and transmitted to a mobile terminal device.

According to a further aspect, an apparatus is provided for monitoring automatic parking of a vehicle, including a video-capturing device for photographing a video image of an execution of the automatic parking, and a communication interface which is designed to transmit the recorded video image to a mobile terminal device.

According to another aspect, a system is provided for monitoring automatic parking of a vehicle, including the apparatus according to the present invention and a mobile terminal device having a communication interface which is designed to receive the captured video image.

According to another aspect, a parking system is provided for the parking of vehicles, including one or more parking spaces for the parking of vehicles, and the apparatus according to the present invention.

According to one aspect, a vehicle is provided which includes the apparatus of the present invention. That is to say, according to one specific embodiment, a vehicle is thus provided, including at least one video camera inside the vehicle for taking a video image during the automatic parking, and a communication interface for transmitting the captured video image to a mobile terminal device.

The present invention includes photographing the automatic parking maneuver of the vehicle and transmitting the recorded video image to a mobile terminal device. In particular, this yields the technical advantage that a user of the mobile terminal device is able to monitor or track the parking maneuver of his vehicle. In particular, this is accomplished regardless of the location of the user. In other words, the driver, here, the user, may thus be far away from the location where the vehicle is being parked automatically. So, for example, a driver is able to leave and lock his vehicle at the entrance of a parking garage. His vehicle then parks automatically, thus, without the assistance of the driver. This parking process is photographed and transmitted to the mobile terminal device of the user. Thus, for example, the driver may already be in a shopping center or in a hotel, and is able to monitor the automatic parking operation from there. The automatic parking is referred to specifically as "valet parking." "Automatic" means here especially without assistance or intervention of a driver. The vehicle parks autonomously or independently.

In particular, the video image is transmitted to the mobile terminal device via a communication network. For example, the communication network includes a mobile cellular communication network and/or a WLAN network.

According to one specific embodiment, the mobile terminal device is a cell phone, a smartphone, a tablet or a laptop.

In another specific embodiment, in response to the sensing of a stop wish, the mobile terminal device transmits a stop signal to the vehicle which, in reaction to reception of the stop signal, stops the execution of the parking. In particular, this results in the technical advantage that in the event of a problem, the user is able to discontinue the parking maneuver. This is accomplished remotely or from a distance. That is, the owner of the vehicle is thus able to intervene at any time in the automatic parking maneuver and stop the vehicle. This, for instance, if the automatic parking maneuver would go wrong because of an unrecognized obstacle which, however, due to the video image transmitted to the mobile terminal device of the owner, becomes recognizable. Consequently, possible damage to the vehicle or damage to further objects may advantageously be avoided.

In other words, the user of the terminal device thus expresses a stop wish, the mobile terminal device sensing this stop wish. Meaning that the mobile terminal device is thus designed to sense a stop wish. For example, the sensing includes acoustic and/or haptic and/or tactile and/or visual sensing.

According to one specific embodiment, in response to a twice-repeated sensing of a stop wish, the mobile terminal device transmits a stop signal to the vehicle which, in reaction to reception of the stop signal, stops the execution of the parking. That is, the driver must express a stop wish twice before the mobile terminal device transmits a stop signal to the vehicle. Meaning that here, the transmitting of the stop signal is secured by a twice-repeated confirmation by the owner on his mobile terminal device. Unintentional triggering of the transmission of the stop signal may therefore advantageously be avoided.

According to one specific embodiment, a secure data connection is set up or formed between the mobile terminal device and the vehicle. In particular, a secure data connection is an encrypted data connection. For instance, this provides the technical advantage that no one who is unauthorized is able to abort the parking operation.

According to a further specific embodiment, in the event the automatic parking is being carried out in a parking facility monitored by a parking-facility management system, in response to the sensing of the stop wish, a message is transmitted to the parking-facility management system to inform the parking-facility management system that a problem has occurred in the parking facility.

In particular, the technical advantage is thereby provided that the parking-facility management system knows that an automatic parking process has been aborted. Since, generally, the reason is that unforeseen obstacles are present, the parking-facility management system is given the possibility of intervening manually here where appropriate, and eliminating the obstacle. Consequently, after the obstacle has been eliminated, advantageously, the automatic parking may quickly be resumed.

Notably, the stop signal may also be referred to as an emergency-stop signal. In particular, the stop signal is also transmitted via the communication network.

According to a further specific embodiment, several video images of the execution of the automatic parking of the vehicle are captured. In particular, the video images are taken at different points in time. That is, the execution of the automatic parking of the vehicle may thus be tracked over time. The various video images are transmitted to the mobile terminal device.

According to another specific embodiment, the at least one video image includes a video image of a parking area in which the vehicle is to be parked automatically. In particular, this brings about the technical advantage that the final position, thus, the position in which the vehicle is to be parked automatically, here the parking area, is recognizable for a driver. Therefore, the driver is able to precisely monitor the parking maneuver at the target position, thus, at the parking area, for the situation there is usually cramped.

In particular, a parking area within the meaning of the present invention is a parking place or a parking space. In general, a parking area is a parking spot for a vehicle in which the vehicle may be parked, thus, switched off.

According to another specific embodiment, the at least one video image includes a video image taken by a camera inside the vehicle and/or a video image taken by a camera external to the vehicle.

For instance, an in-vehicle camera is a stereo-video camera or a multifunction/mono camera. In particular, the video camera is a video camera that provides a top-view functionality. Notably, a plurality of in-vehicle cameras are provided, each of which records or captures corresponding video images, the captured video images then being transmitted to the mobile terminal device. Advantageously, several viewing angles from the different in-vehicle cameras of the vehicle are therefore available to the user of the terminal device.

According to one specific embodiment, the camera external to the vehicle is an in-vehicle camera of a further vehicle or a monitoring camera of a monitoring system external to the vehicle. In particular, a plurality of cameras external to the vehicle are provided. In other words, both at least one in-vehicle camera of a further vehicle and at least one monitoring camera of a monitoring system external to the vehicle thus photograph the execution of the automatic parking of the vehicle, the corresponding video images then being transmitted to the mobile terminal device. Notably, this yields the technical advantage that the vehicle itself does not have to have any in-vehicle cameras, but nevertheless, the automatic parking is able to be monitored, namely, with the aid of the cameras external to the vehicle.

According to one specific embodiment, the video images of the in-vehicle camera of the further vehicle are made available to the mobile terminal device via a cloud infrastructure, e.g., via a cloud infrastructure of a social network.

According to a further specific embodiment, a monitoring system external to the vehicle tracks the vehicle during the execution of the automatic parking, and communicates with the vehicle during the tracking for the purpose of determining the position of the vehicle, a correspondingly determined vehicle position being transmitted to the mobile terminal device for position tracking. This brings with it the special technical advantage that, in addition to the visual monitoring, positions of the vehicle are also transmitted to the mobile terminal device. Advantageously, this permits an even better, more precise monitoring of the vehicle. For example, to track the vehicle with the aid of the monitoring system external to the vehicle, the monitoring system detects and identifies a license plate of the vehicle, so that the vehicle is able to be recognized on the basis of its license plate.

Preferably, the monitoring system external to the vehicle is included by a parking system, especially a parking garage. At the beginning of the valet parking operation (thus, at the beginning of the automatic parking), it has determined the target position of the vehicle—therefore the target parking space. Consequently, the parking-garage management system knows where the car should go, and the "path" or "progression" of the monitoring cameras may be determined in order to track the vehicle through the parking garage.

If the occasion arises that the vehicle must take a different parking space, since the target position is blocked by an obstacle (e.g., a shopping cart or a "non-valet-parking" vehicle"), it may then, of course, be diverted. In one specific embodiment, a substitute parking space is then requested from the parking-garage management system, which determines a new target position, so that a new tracking may be carried out via the security cameras or monitoring cameras of the parking-garage monitoring system external to the vehicle.

Preferably, the communication itself is based on standard Ethernet—thus, networking such as a PC network or WiFi (WLAN), or proprietary security networks of building services engineering or other communication technology familiar to one skilled in the art.

According to one specific embodiment, a monitoring system external to the vehicle is provided that, in particular, has one or more monitoring cameras. Thus, in general, the monitoring system includes a video-capturing device having one or more monitoring cameras. For instance, the monitoring cameras may represent reference points for the progression of the automatic parking maneuver, after successful identification (e.g., by detecting the license plate of the vehicle), the monitoring cameras preferably passing on or transmitting the monitoring image, thus, the recorded video image, to the owner of the vehicle, that is, to the mobile terminal device.

According to one specific embodiment, the mobile terminal device includes a display unit, e.g., a screen, especially a touchscreen, for displaying the transmitted video image.

Specific embodiments with regard to the apparatus, the system and the parking system are derived in analogous manner from specific embodiments with regard to the method and vice versa. Correspondingly, remarks made in connection with the method hold true analogously for the apparatus, the system and the parking system and vice versa.

The present invention is explained in greater detail below on the basis of preferred exemplary embodiments.

DETAILED DESCRIPTION OF EXAMPLE EMBODIMENTS

Figure 1:
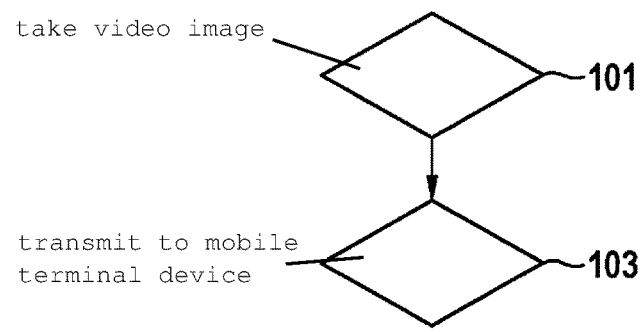
FIG. 1 shows a flowchart of a method for monitoring automatic parking of a vehicle.

FIG. 1 shows a flowchart of a method for monitoring automatic parking of a vehicle.

According to a step 101, at least one video image is taken of an execution of the automatic parking of the vehicle. In a step 103, the captured video image is transmitted to a mobile terminal device. For example, the mobile terminal device is a smartphone. Specifically, the transmission is accomplished via a communication network. In particular, the mobile terminal device displays the recorded video image.

Figure 2:
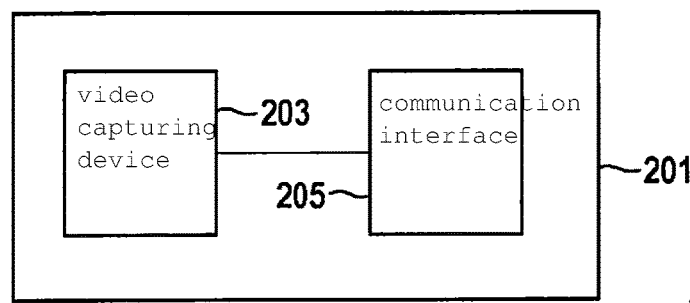
FIG. 2 shows an apparatus for monitoring automatic parking of a vehicle.

FIG. 2 shows an apparatus 201 for monitoring automatic parking of a vehicle.

Apparatus 201 includes a video-capturing device 203 for capturing a video image of an execution of the automatic parking. In addition, apparatus 201 includes a communication interface which is designed to transmit the recorded video image to a mobile terminal device.

According to one specific embodiment (not shown), video-capturing device 201 includes one or more video cameras. For instance, the video cameras are video cameras inside the vehicle and/or external to the vehicle. In particular, that is to say that during the automatic parking of the vehicle, video cameras inside the vehicle thus take video images of a vehicle environment and transmit these captured video images to the mobile terminal device. The video cameras external to the vehicle are especially in-vehicle video cameras of further vehicles and/or monitoring cameras of a monitoring system.

Figure 3:
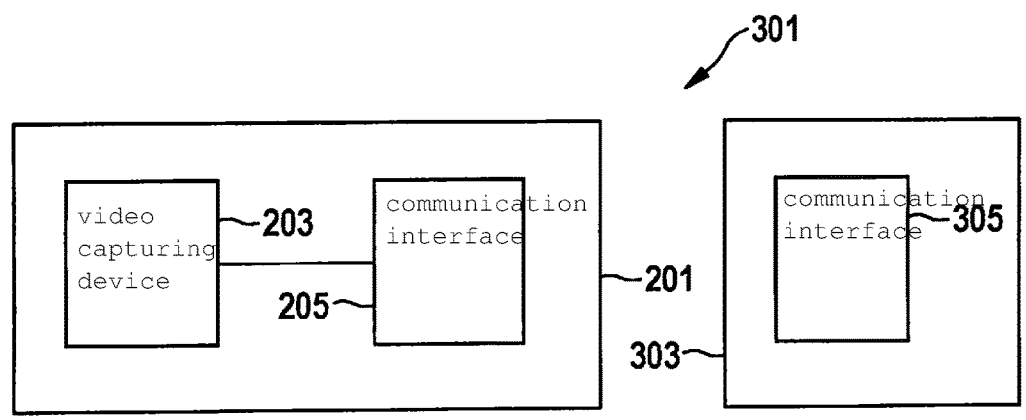
FIG. 3 shows a system for monitoring automatic parking of a vehicle.

FIG. 3 shows a system 301 for monitoring automatic parking of a vehicle.

System 301 includes apparatus 201 of FIG. 2, as well as a mobile terminal device 303 which has a communication interface 305 that is designed to receive the captured video image. For example, mobile terminal device 303 is a smartphone. Mobile terminal device 303 includes a display unit, for instance, for displaying the received video image.

Figure 4:
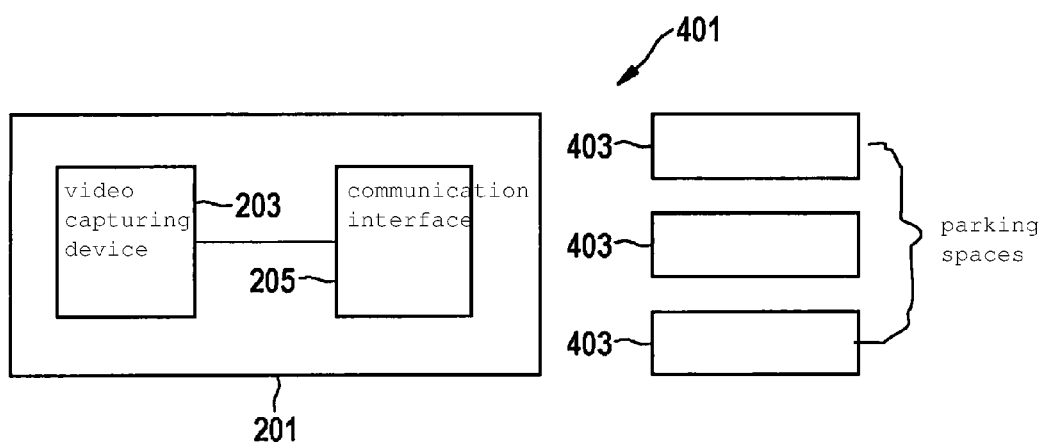
FIG. 4 shows a parking system for the parking of vehicles.

FIG. 4 shows a parking system 401 for the parking of vehicles.

Parking system 401 includes apparatus 201 of FIG. 2, as well as one or more parking spaces 403 for the parking of vehicles.

According to one specific embodiment, the plurality of parking spaces are assigned to a parking garage. In other words, the parking system thus includes a parking garage having a plurality of parking spaces for parking vehicles, as well as the apparatus according to the present invention.

Thus, the invention expressly includes the idea of expanding known automatic parking methods to the effect that vehicle tracking is made available as video image, and in particular, at the end of the parking maneuver, a video image at the parking position is also provided.

The features and specific embodiments cited hereinafter are provided individually or in combination in further specific embodiments:

What is claimed is:

1. A method for monitoring automatic parking of a vehicle, comprising:

capturing at least one video image of an execution of the automatic parking of the vehicle; and transmitting the at least one video image to a mobile terminal device, wherein the at least one video image includes a video image taken by at least one camera external to the vehicle, and wherein the camera external to the vehicle is one of: i) an in-vehicle camera of a further vehicle, or ii) a monitoring camera of a monitoring system located remotely from the vehicle at a facility where the execution of the automatic parking occurs, and wherein the at least one camera includes a plurality of cameras selected from a larger set of cameras, the plurality of cameras being selected according to a progression that tracks an intended path of the vehicle during the automatic parking of the vehicle.

2. The method as recited in claim 1, wherein the at least one video image includes a video image of a parking area in which the vehicle is intended to be parked automatically.

3. The method as recited in claim 1, wherein the at least one video image includes at least one of: i) a video image taken by a camera inside the vehicle, and ii) a video image taken by a camera external to the vehicle.

4. The method as recited in claim 1, wherein a monitoring system external to the vehicle tracks the vehicle during the execution of the automatic parking, and during the tracking, communicates with the vehicle for the purpose of determining the position of the vehicle, a correspondingly determined vehicle position being transmitted to the mobile terminal device for position tracking.

5. The method as recited in claim 1, wherein in response to sensing of a stop wish, the mobile terminal device transmits a stop signal to the vehicle which, in reaction to the reception of the stop signal, stops the execution of the parking.

6. The method as recited in claim 5, wherein in the event the automatic parking is being carried out in a parking facility monitored by a parking-facility management system, in response to the sensing of the stop wish, a message is transmitted to the parking-facility management system to inform the parking-facility management system that a problem has occurred in the parking facility.

7. An apparatus for monitoring automatic parking of a vehicle, comprising:

a video-capturing device for capturing a video image of an execution of the automatic parking; and a communication interface designed to transmit the captured video image to a mobile terminal device, wherein the video-capturing device includes at least one camera external to the vehicle, and wherein the camera external to the vehicle is one of: i) an in-vehicle camera of a further vehicle, or ii) a monitoring camera of a monitoring system located remotely from the vehicle at a facility where the execution of the automatic parking occurs, and wherein the at least one camera includes a plurality of cameras selected from a larger set of cameras, the plurality of cameras being selected according to a progression that tracks an intended path of the vehicle during the automatic parking of the vehicle.

8. A system for monitoring automatic parking of a vehicle, comprising:
  an apparatus for monitoring automatic parking of a vehicle, the apparatus including a video-capturing device for capturing a video image of an execution of the automatic parking, and a communication interface designed to transmit the captured video image to a mobile terminal device; and
  a mobile terminal device having a respective communication interface which is designed to receive the captured video image, wherein the video-capturing device includes at least one camera external to the vehicle, and wherein the camera external to the vehicle is one of: i) an in-vehicle camera of a further vehicle, or ii) a monitoring camera of a monitoring system located remotely from the vehicle at a facility where the execution of the automatic parking occurs, and wherein the at least one camera includes a plurality of cameras selected from a larger set of cameras, the plurality of cameras being selected according to a progression that tracks an intended path of the vehicle during the automatic parking of the vehicle.

9. A parking system for the parking of vehicles, comprising:
  one or more parking spaces for the parking of vehicles; and
  an apparatus for monitoring automatic parking of a vehicle, the apparatus including a video-capturing device for capturing a video image of an execution of the automatic parking, and a communication interface designed to transmit the captured video image to a mobile terminal device, wherein the video-capturing device includes at least one camera external to the vehicle, and wherein the camera external to the vehicle is one of: i) an in-vehicle camera of a further vehicle, or ii) a monitoring camera of a monitoring system located remotely from the vehicle at a facility where the execution of the automatic parking occurs, and wherein the at least one camera includes a plurality of cameras selected from a larger set of cameras, the plurality of cameras being selected according to a progression that tracks an intended path of the vehicle during the automatic parking of the vehicle.

* * * * *